United States Patent [19]

Sullivan et al.

[11] 4,162,906

[45] Jul. 31, 1979

[54] SIDE OUTLET TUBE

[75] Inventors: Bruce M. Sullivan, Burnsville; Allen M. Kaluza, Minneapolis, both of Minn.

[73] Assignee: Donaldson Company, Inc., Minneapolis, Minn.

[21] Appl. No.: 794,045

[22] Filed: May 5, 1977

[51] Int. Cl.[2] .............................................. B01D 45/16

[52] U.S. Cl. ........................................ 55/346; 55/337; 55/426; 55/457; 210/512 R

[58] Field of Search ...................... 210/512 R, 512 M; 55/346, 347, 449, 456, 457, 426, 337

[56] References Cited

U.S. PATENT DOCUMENTS

| | | | |
|---|---|---|---|
| 1,923,498 | 8/1933 | Nallinger | 55/457 X |
| 2,889,008 | 6/1959 | Copp et al. | 55/348 |
| 3,169,842 | 2/1965 | Streete et al. | 55/457 X |
| 3,713,280 | 1/1973 | Keller et al. | 55/457 X |
| 3,915,679 | 10/1975 | Roach et al. | 55/457 X |

FOREIGN PATENT DOCUMENTS

| | | | |
|---|---|---|---|
| 84116 | 6/1954 | Norway | 210/512 |
| 877628 | 9/1961 | United Kingdom | 210/512 |

*Primary Examiner*—William A. Cuchlinski, Jr.
*Attorney, Agent, or Firm*—Merchant, Gould, Smith, Edell, Welter & Schmidt

[57] ABSTRACT

A side outlet cyclone separator tube having an improved vortex generating device and an air cleaner incorporating the separator tube are disclosed. The tube includes a conduit member which defines a generally axial passageway for the discharge of contaminants from contaminant laden air. A second conduit member is disposed within the first conduit member and defines an outlet passageway for the discharge of clean air through an opening in the side wall of the first conduit member. The improved vortex generating device includes an elongated hub about which are spaced a plurality of generally helical deflecting vanes. A trailing end of the elongated hub has a curved surface which directs contaminants radially toward the inner surface of the first conduit member. The air cleaner has a plurality of side outlet separator tubes aligned in parallel rows, adjacent rows disposed with the side outlets directed toward each other and off-set with respect to the side outlets of the adjacent row to define clean air exhaust channels within the air cleaner housing.

12 Claims, 12 Drawing Figures

SIDE OUTLET TUBE

BACKGROUND OF THE INVENTION

The present invention relates broadly to cyclone separator tubes, and, in particular, to an improved cyclone separator tube having a side outlet for clean air, and an improved means for generating a vortex in the axial flow of contaminant laden air through the separator tube.

The prior art includes two basic types of cyclone separator tubes. In a straight-through axial flow separator tube, such as that disclosed in U.S. Pat. No. 3,517,821, contaminated air enters the separator tube and passes through a helical vane device which generates a vortex in the flow of the contaminant laden air. A clean air outlet conduit is disposed near the outlet of the separator tube and concentrically positioned with respect to the tube. A contaminant output channel is defined by the exterior surface of the clean air outlet conduit and the inner surface of the separator tube. The contaminants are thrown outward toward the inner surface of the separator tube and are discharged through the defined channel. Clean air passes axially into the clean air outlet conduit. High flow rates are achieved in the straight-through axial flow separator tube by providing a scavenge air flow. The scavenge air flow facilitates the contaminant exhaust flow by minimizing turbulence and thereby permitting higher flow rates within the separator tube.

Reverse flow cyclone separator tubes are also known in the prior art. Examples of such separator tubes are disclosed in U.S. Pat. Nos. 3,517,821; 3,498,461; 2,889,008; and 2,887,177; which are assigned to the assignee of the present application. In the reverse flow cyclone separator tube, a clean air outlet is concentrically disposed within the separator tube near the inlet end thereof. Flow deflecting vanes at the inlet of the separator tube again generate a vortex in the axial flow of contaminant laden air into the separator tube. The contaminants are discharged via straight-through axial flow. Clean air, on the other hand, reverses its flow entering the clean air outlet conduit. The pressure drops experienced in the reverse flow cyclone separator tubes necessitate a clean air outlet conduit having a length at least as long and preferrably greater than the length of the separator tube. Thus, the reverse flow devices are somewhat bulky and do not permit compact packaging within an air cleaner. Additionally, the reverse flow devices have lower throughput than straight-through axial cyclone separators. In an air cleaner housing, both prior art cyclone separator tubes, i.e. straight-through flow or reverse flow, require substantial space for manifolding of clean air from the separator tubes to a final filter element.

In the above-mentioned U.S. Pat. No. 3,517,821, a helical vane vortex generating element is disclosed. This prior art vortex generating element includes a trailing end having a surface which tapers toward the clean air outlet conduit. It was found that with this vortex generating element structure some of the lighter contaminants became entrapped at the inner periphery of the vortex and would thereby enter the clean air outlet conduit, decreasing the efficiency of the contaminant separation.

The side outlet cyclone separator tube of the present invention combines the advantages of high flow rates and efficiency of a straight-through axial cyclone separator with the non-scavenge flow characteristics of a reverse flow cyclone separator. The side outlet cyclone tube also provides for reduced packaging requirements by minimizing the space required by the prior art devices for manifolding fluids from the separator tubes to the final filter. Additionally, the present invention incorporates an improved vane structure for generating a vortex in the flow of contaminant laden air that can also be utilized to increase the efficiency of the prior art straight-through cyclone separator by directing contaminants trapped at the inner periphery of the vortex toward the side wall of the separator tube.

SUMMARY OF THE INVENTION

The present invention is a side outlet cyclone separator tube that includes a first conduit member with a continuous side wall defining an axial passageway between inlet and outlet ends thereof. The side wall of the first conduit member has an aperture located intermediate the inlet and outlet ends. A second conduit member also having a continuous side wall and defining a passageway between inlet and outlet ends is disposed within the axial passageway of the first conduit member. The inlet end of the second conduit member is positioned proximate the inlet and of the first conduit member. The outlet end of the second conduit member terminates at the aperture in the side wall of the first conduit member. The side outlet cyclone separator tube further includes a vortex generating device affixed to the first conduit member within the axial passageway at the inlet end of the first conduit member. The vortex generating device imparts a circular flow component to the axial flow of the contaminant laden air entering the inlet end of the tube such that contaminants are centrifugally thrown toward the inner surface of the first conduit member. The contaminants are discharged through the outlet end of the first conduit member while clean air is channeled through the second conduit member to discharge through the side wall aperture in the first conduit member.

The improved vortex generating means of the present invention includes a plurality of deflecting vanes circumferentially spaced about an elongated hub member having a leading and trailing end and a longitudinal axis aligned with a substantially central axis of a separator tube. Each deflecting vane has a leading edge disposed proximate the inlet end of the separator tube and a trailing edge positioned axially along the hub member in a direction toward the outlets of the tube. A deflecting surface extends axially from the leading edge of each vein and circumferentially about the hub toward the trailing edge. The deflecting surface imparts a circular flow component to the axial flow of contaminant laden air. The trailing end of the hub member has a curved surface which is directed generally radially outward from the longitudinal axis of the hub and axially in a direction toward the outlet end of the tube. The diverging surface directs contaminants which may be trapped at the inner periphery of the vortex generated by the deflecting vanes toward the inner surface of the separator tube facilitating discharge of the contaminants.

In one embodiment, the side outlet separator tube of the present invention includes a first conduit which has a tubular portion defining the inlet end of the separator tube and a frustoconical portion defining the outlet end of the separator tube. The second conduit member defines a passageway having a curved central axis from its inlet end to a side outlet aperture in the tubular portion. The passageway defined by the second conduit member has a cross-sectional area taken along planes normal to its curved axes that increases gradually from its inlet end to the outlet aperture. The passageway of gradually increasing area diffuses the exhaust clean air allowing a recapture of the pressure drop experienced within the vortex generated by the separator tube.

In an alternative embodiment, the separator tube of the present invention includes a first conduit member having a tubular portion proximate the inlet end of the tube and a second portion which has the shape of a frustum of a right oblique cone. The side outlet aperture is formed in the second portion which defines a converging contaminant discharge passageway of decreasing cross-sectional area toward the outlet end of the separator tube. The second conduit member of the alternative embodiment of the separator tube also has a diverging discharge passageway for clean air. This alternative embodiment provides particular advantages when a plurality of such tubes are incorporated into an air cleaner structure.

An improved air cleaner which incorporates this alternative embodiment of the separator tube includes a housing having inlet and outlet conduits and a pair of baffles secured within the housing to divide the housing into an inlet chamber, a dust collection chamber, and a clean air outlet chamber. A plurality of separator tubes are connected between the baffles to provide fluid communication between the three chambers within the housing. In particular, the side outlet separator tubes are aligned in parallel rows with the side outlet apertures of the tubes in one row directed toward the tubes in an adjacent row. The side outlet apertures of one row are offset with respect to the side outlet apertures of the adjacent row to define clean air discharge channels within the clean air outlet chamber of the housing. An annular filter element is disposed within the clean air outlet chamber to provide a final filter stage before the clean air exits the housing.

The advantages of the present invention will become apparent with reference to the detailed description of the preferred embodiments, drawings, and claims.

DETAILED DESCRIPTION OF THE PREFERRED EMBODIMENT

Figure 1:
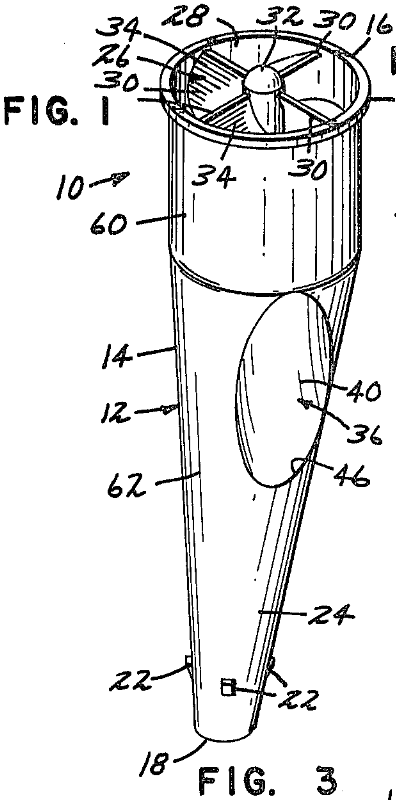
FIG. 1 is a view in perspective of one embodiment of the side outlet separator tube of the present invention.

Referring to the drawings, wherein like numerals represent like parts throughout the several views, one embodiment of the side outlet cyclone tube incorporating the present invention is shown in perspective in FIG. 1 and is indicated generally as 10. Separator tube 10 has a first conduit member 12 having a continuous side wall 14 which defines a generally axial passageway between an inlet end 16 and an outlet end 18. Inlet end 16 is provided with an annular flange 20 which facilitates mounting of separator tube 10 in an air cleaner housing as will be described in more detail hereafter. Ramp-like projections 22 may be circumferentially spaced about an outer surface 24 of continuous side wall 14 near outlet end 18. Ramp-like projections 22 also facilitate mounting of separator tube 10 in an air cleaner housing.

Figure 4:
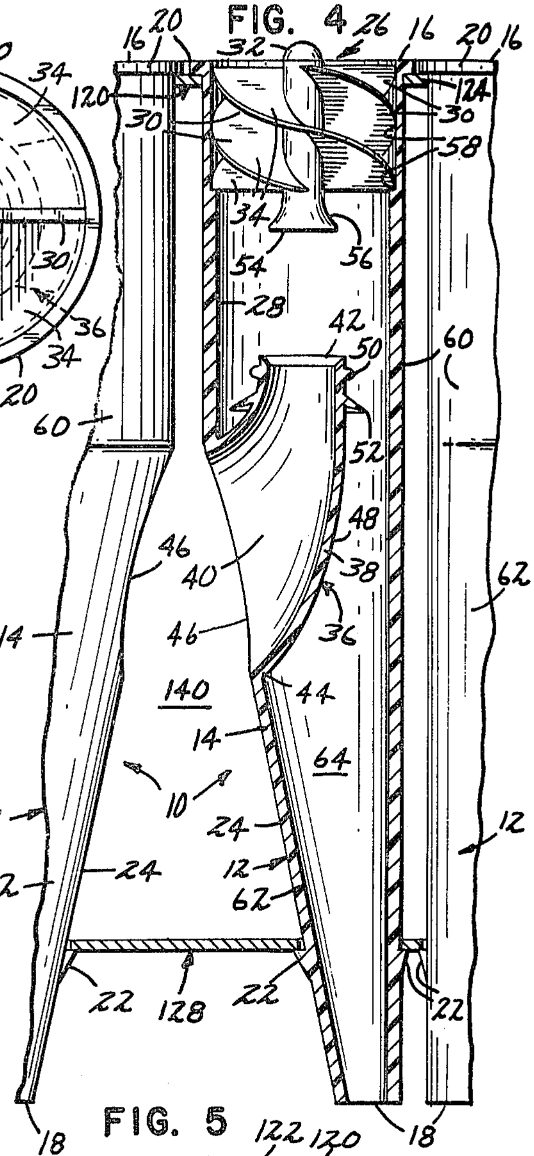
FIG. 4 is an enlarged fragmentary cross-sectional view illustrating the separator tube of FIG. 1 taken along line 4—4 of FIG. 3.

As shown in more detail in FIG. 4, separator tube 10 has a vortex generating means 26 affixed to an inner surface 28 of continuous side wall 14 at inlet end 16. Vortex generating means 26 includes a plurality of blades 30 radially spaced about a central hub 32 having a longitudinal axis aligned with the central axis of separator tube 10. Blades 30 have curved surfaces, as indicated at 34, which impart a circular flow component to contaminant laden air entering inlet end 16. As will be described in more detail with respect to the operation of the present invention, blades 30 generate a vortex in the flow of contaminant laden air.

A second conduit member 36 is disposed within separator tube 10 and has a continuous side wall 38 which defines a passageway 40 between an inlet end 42 and an outlet end 44. Outlet end 44 terminates at an opening 46 provided in continuous side wall 14 of separator tube 10. Inlet end 42 is aligned along the central axis of separator tube 10. Continuous side wall 38 has an outer surface 48 to which is affixed a baffle means, which, in the preferred embodiment, includes at least one annular lip 50. Annular lip 50 is disposed proximate inlet end 42 of second Conduit member 36. A second annular lip member 52 may also be provided and spaced from annular lip 50 along the central axis of separator tube 10. In the embodiment illustrated in FIG. 4, annular lip member 52 may be conical in shape, however, it will be understood that shapes other than conical are within the spirit and scope of the present invention.

As shown more particularly in FIG. 4, passageway 40 has a curved central axis and a cross-sectional area measured along planes normal to the curved central axis which gradually increases from inlet end 42 to outlet end 44. Thus, clean air diffuses in its flow through passageway 40 regaining pressure losses experienced within the vortex flow of separator tube 10.

Central hub 32 of vortex generating means 26 has a tail section 54 positioned near inlet 42 of second conduit member 36. Tail section 54 has a surface 56 which is sloped radially outward from the central axis of separator tube 10 toward inner surface 28. Surface 56 facilitates the discharge of contaminants through outlet end 18 as will be described in more detail hereafter. Inner surface 28 of separator tube 10 may be provided with an annular recess at 58 on which the edges of blades 30 rest to mount vortex generating means 26 within separator tube 10. Any conventional means of securing vortex generating means 26 within separator tube 10 may be utilized and is within the spirit and scope of the present invention.

In the embodiment shown in FIG. 1–FIG. 5, first conduit member 12 includes a first tubular portion 60 and a second portion 62 which is a frustum of a hollow oblique cone. As shown more particularly in FIG. 3, side wall 14 converges along the central axis of separator tube 10 from first tubular portion 60 to outlet end 18 defining a passageway 64 of decreasing cross-sectional area toward outlet end 18. The opening at outlet end 18 is, therefore, off-set with respect to the central axis of separator tube 10. Opening 46 is disposed in converging side wall 14 of second portion 62.

Figure 6:
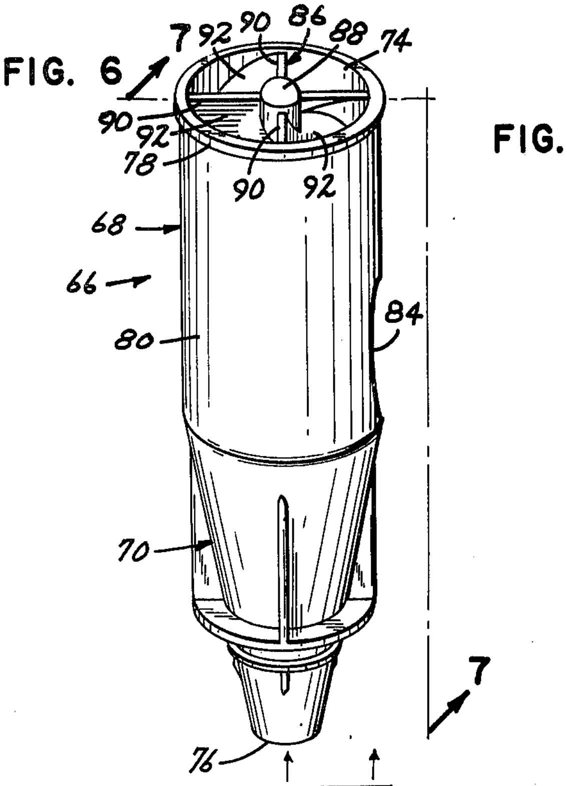
FIG. 6 is a view in perspective of an alternative embodiment of the side outlet separator tube of the present invention.
Figure 7:
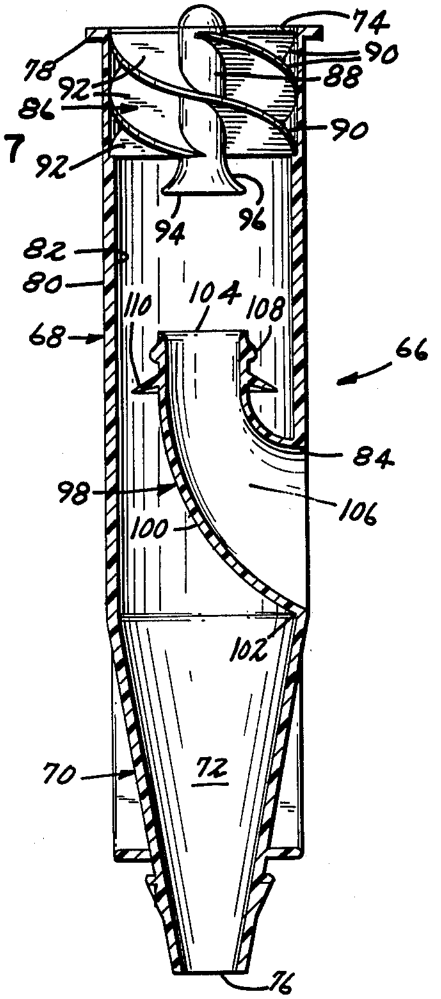
FIG. 7 is an enlarged cross-sectional view of the separator tube shown in FIG. 6 taken along line 7—7 of FIG. 6.

An alternative embodiment of the present invention is shown in FIGS. 6 and 7 and is a separator tube 66 having a first tubular portion 68 and a frusto-conical portion 70. Sepator tube 66 has an inlet opening at 74 and an outlet opening at 76. Disposed about inlet opening 74 is an annular flange 78 to facilitate mounting separator tube 66 in an air cleaner housing. First tubular portion 68 has an outer surface 80 and an inner surface 82. A side outlet aperture 84 is provided in tubular portion 68.

A vortex generating means 86 is mounted within first tubular portion 68 proximate inlet opening 74. Vortex generating means 86 includes an elongated central hub 88 having a longitudinal axis aligned with the central axis of separator tube 66. Affixed to hub 86 are a plurality of blades 90 having curved surfaces as indicated at 92 which impart a circular flow component to the contaminant laden air entering opening 74 in a direction radially outward from and circular about the central axis of tube 66. Thus, a vortex is generated in the axial flow of contaminant laden air from inlet opening 74 to outlet opening 76. Central hub 88 may be provided with a tail section 94 aligned along the axis of separator tube 10 and provided with a surface 96 which slopes radially outward from the central axis toward inner surface 82. A conduit 98 is disposed within first tubular portion 68 and has an outer surface 100. Conduit 98 has an outlet end 102 which is secured to inner surface 82 at side outlet aperture 84. An inlet end 104 of conduit 98 is aligned along the central axis of tubular portion 68 and disposed proximate tail section 94. In the preferred embodiment, conduit 98 defines a passageway 106 having a curved axis with a gradually increasing cross-sectional flow area from inlet end 104 to outlet end 102. A first annular lip 108 is affixed to outer surface 100 proximate inlet end 104. A second annular lip 110 which is generally frusto-conical in shape may also be affixed to outer surface 100 spaced from annular lip 108 along the axis of separator tube 66. Frusto-conical portion 70 defines an axial contaminant discharge passageway 72 of decreasing cross-sectional area between first tubular portion 68 and outlet end 76.

Figure 3:
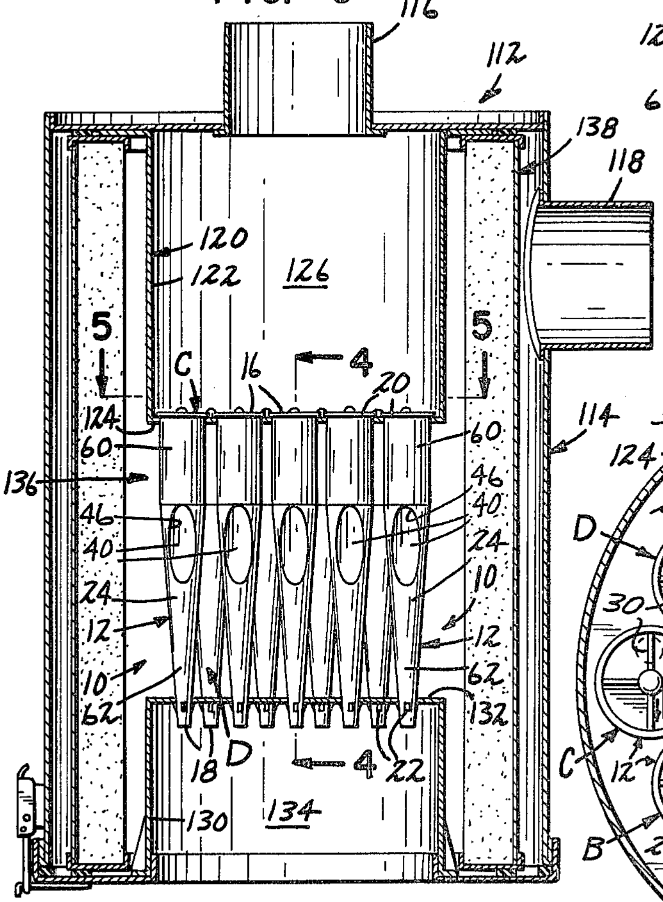
FIG. 3 is a sectional view of an improved air cleaner incorporating the separator tube shown in FIG. 1.
Figure 5:
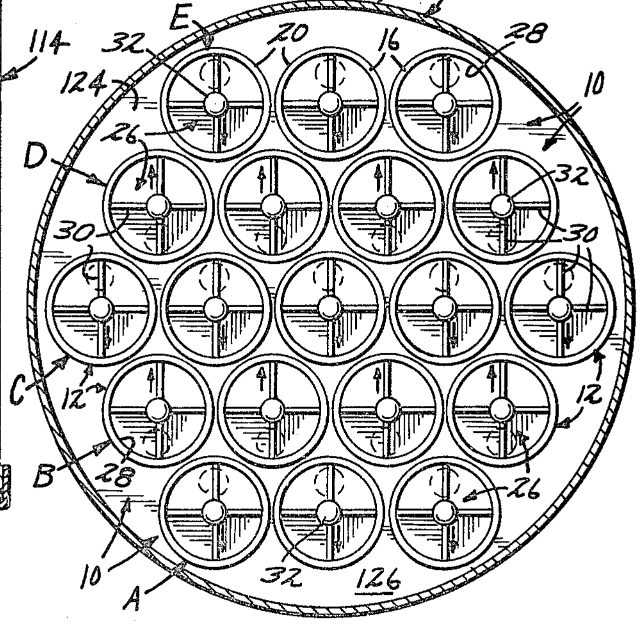
FIG. 5 is an enlarged cross-sectional view of a portion of FIG. 3 taken along line 5—5 of FIG. 3.

FIGS. 3 and 5 illustrate an air cleaner 112 utilizing a plurality of separator tubes 10 as disclosed in the first embodiment of the present invention. Air cleaner 112 has a housing 114 provided with an inlet conduit 116 and an outlet conduit 118. Secured within housing 114 is a first baffle member 120 which, in the preferred embodiment, has a cylindrical side wall 122 and a circular base 124 which define a contaminant laden air inlet chamber 126 within housing 114. A second baffle member 128 is also secured within housing 114 and has a cylindrical side wall 130 and a circular base 132 defining a contaminant collection chamber 134. First baffle member 120 and second baffle member 128 further define a clean air outlet chamber 136 in housing 114.

Separator tubes 10 provide for fluid communication between chambers 126, 134, and 136. As shown more particularly in the enlarged view of FIG. 5, circular base 124 has a plurality of apertures which receive inlet ends 16 of separator tubes 10. Base 132 is also provided with a plurality of apertures through which outlet ends 18 of tubes 10 are inserted. As shown in FIG. 3, annular flange 20 and ramp-like projections 22 on each separator tube 10 facilitate mounting of separator tubes 10 in base members 124 and 132, respectively. Passageway 64 provides fluid communication between inlet chamber 126 and collection chamber 134. Side outlet openings 46 of separator tubes 10 provide fluid communication between inlet chamber 126 and outlet chamber 136. Disposed within outlet chamber 136 is an annular filter element 138 which serves as a final filter stage of air which exits openings 46, passes through filter element 138 and into outlet conduit 118.

As shown in FIGS. 3 and 5, separator tubes 10 are aligned in parallel rows A, B, C, D, and E. In FIG. 5, the arrows indicate the direction of flow through side openings 46 in separator tubes 10. As illustrated, tubes 10 in adjacent rows, for example rows B and C, have their outlet openings 46 disposed so that air exiting openings 46 of tubes 10 in row B is directed toward row C, and vice-versa. It will also be noted that outlet openings 46 of tubes 10 in one row are offset with respect to outlet openings 46 of tubes 10 in the adjacent row. This alignment of separator tubes 10 defines a plurality of outlet air channels as indicated at 140 within outlet chamber 136. Outlet air channels 140 have longitudinal axes that are generally transverse with respect to the longitudinal axis of air cleaner 112, and outlet air channels 140 increase the efficiency of air cleaner 112 by facilitating the exhaust of clean air and consequently permitting higher flow rates. The offset alignment substantially eliminates turbulent flow within channels 140.

Figure 8:
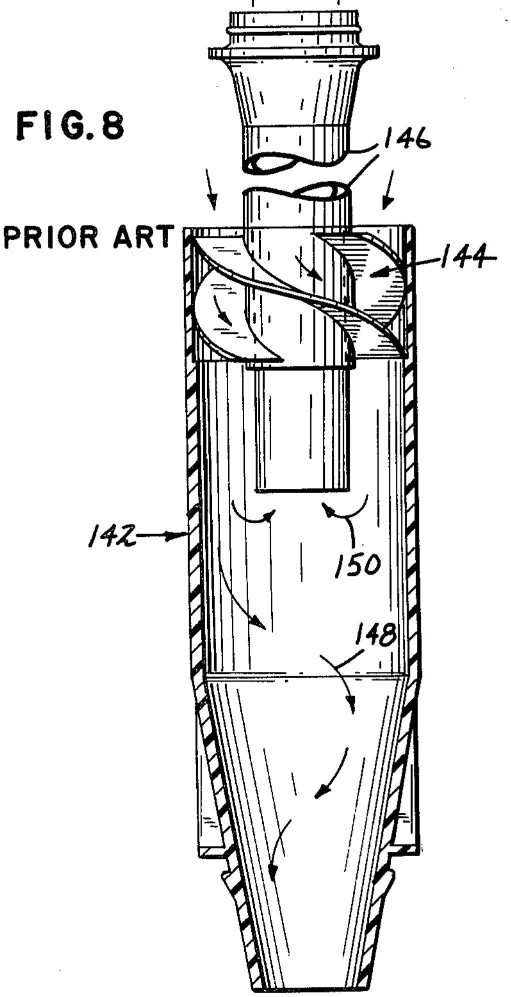
FIG. 8 PRIOR ART
FIG. 8 is an axial sectional view of a prior art reverse flow cyclone separator tube.

The operation of the present invention will now be described first with reference to the prior art cyclone separator tubes shown in FIGS. 8 and 9. FIG. 8 illustrates a reverse flow cyclone separator tube 142 having a vortex generating means 144 at its inlet end. Concentrically disposed within separator tube 142 is a clean air outlet conduit 146. As shown by the arrows, contaminant laden air entering separator tube 142 is given a circular flow component by vortex generating means 144. The heavier contaminants are thrown against the inner surface and are discharged along a generally straight-through axial path, for example path 148. Clean air reverses its flow as shown at 150 and is discharged through outlet conduit 146.

Figure 9:
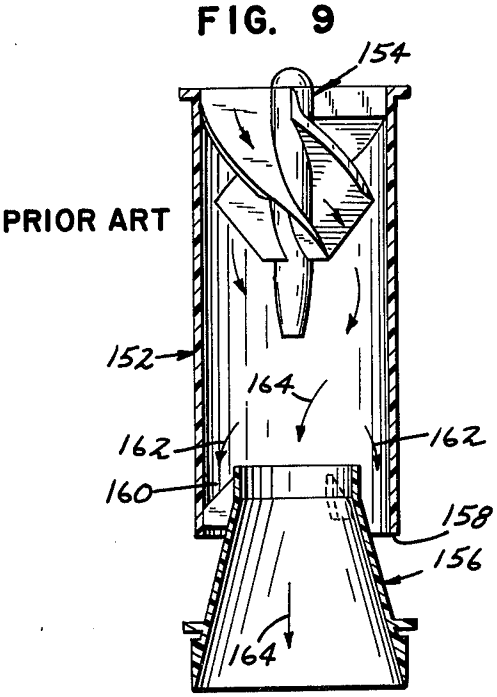
FIG. 9 PRIOR ART
FIG. 9 is an axial sectional view of a prior art straight-through axial cyclone separator tube.
Figure 10:
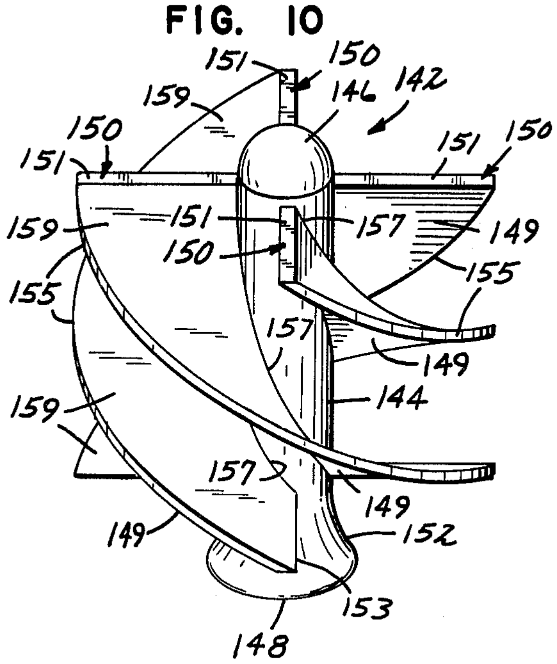
FIG. 10 is a view in perspective of the improved vortex generating device of the present invention as viewed from above.
Figure 11:
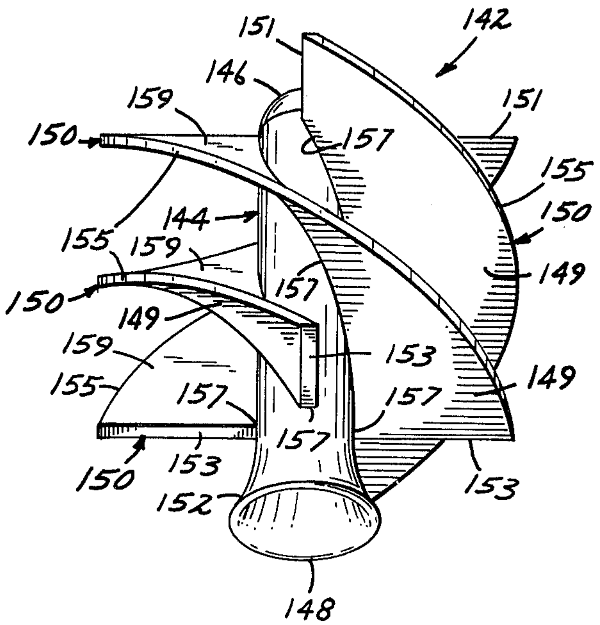
FIG. 11 is another view in perspective of the vortex generating device of the present invention as viewed from below.

FIG. 9 shows a prior art straight-through axial cyclone separator tube 152. Tube 152 is also provided with a vortex generating means 154 and a concentric axially disposed outlet conduit 156 positioned proximate an outlet end 158 of separator tube 152. Again as shown by the arrows, contaminant laden air entering tube 152 is given a circular flow by vortex generating means 154. The heavier contaminants are thrown against the inner surface of tube 152 and are discharged through an annular space 160 defined between outlet conduit 156 and separator tube 152 as shown at 162. Clean air is discharged axially through outlet conduit 156 as shown at 164.

As previously mentioned, the present invention of a side outlet cyclone separator tube combines the advantages of the prior art straight-through axial flow cyclone separator which accomodates high flow rates and high efficiency and the prior art reverse flow cyclone separator which does not require a scavenge air flow. In the embodiment disclosed in FIGS. 1–5, contaminant laden air enters separator tube 10 through inlet end 16 where vortex generating means 26 imparts a circular flow component to the contaminant laden air. The contaminant laden air, thus has a generally helical flow axially through separator tube 10. The heavier contaminants are thrown against inner surface 28 and continue through converging passageway 64 where the contaminants are discharged from outlet end 18. Surface 56 of tail section 54 also deflects contaminants trapped at the inner edge of the vortex toward inner surface 28 of separator tube 10. Clean air is collected by inlet end 42 of tubular member 36 and directed through diffusing passageway 40 to exhaust at side outlet opening 46. The turbulence created within separator tube 10 generates a reverse flow component that has a tendency to direct contaminants upward from passageway 64 along continuous side wall 38 where the contaminants would be drawn into inlet end 42. Annular lip members 50 and 52, however, obstruct this reverse flow of contaminants directing the contaminants back into the helical flow toward and through passageway 64 maintaining substantially clean air exiting from side outlet opening 46. The continuously decreasing cross-sectional area of passageway 64 toward outlet end 18 serves to increase the vortex strength within passageway 64 maintaining the outlet flow of contaminants and preventing separator tube plugging by contaminant buildup within passageway 64.

As previously mentioned, the cross-sectional area of tubular member 36 increases from inlet end 42 to outlet end 44 defining a diffusing passageway 40 for cleaned air. The diffusing passageway 40 allows the discharged clean air to regain pressure losses associated with the high velocity vortex flow generated by vortex generating means 26.

In the alternative embodiment, separator tube 66 functions in similar fashion to separator tube 10. Frustoconical portion 70 defines an axial flow passage of continuously decreasing cross-sectional area to increase the vortex strength near outlet opening 76 maintaining a high flow rate of contaminants and preventing tube plugging due to contaminant buildup. The remaining elements of separator tube 66 function similar to the corresponding elements of separator tube 10.

Separator tubes 10 may be utilized in air cleaner 112. Contaminant laden air enters inlet chamber 126 and is channeled by baffle member 120 into the plurality of separator tubes 10. Contaminants are discharged through outlet ends 18 into contaminant collection chamber 134. Clean air exhausts through side outlet openings 46 into outlet chamber 136. The clean air passes through a final stage comprising annular filter element 138 befor passing from air cleaner 112 through outlet conduit 118. As previously mentioned, outlet air channels 140 defined between adjacent parallel rows of separator tubes 10 facilitate the flow of clean air into chamber 136.

FIGS 10–13 illustrate an improved vortex generating means 142 of the present invention. Vortex generating means 142 includes an elongated hub member 144 having a longitudinal axis a leading end 146 and a trailing end 48. A plurality of radially extending helical vanes 150 are affixed to and circumferentially spaced about elongated hub member 144. Leading end 146 may be hemispherical in shape while trailing end 148 has an outer surface 152 which curves radially outward from the longitudinal axis of hub member 144 and generally in a direction away from leading end 146.

Each vane 150 has a leading edge 151, a trailing edge 153, an outer edge 155, and an inner edge 157 affixed to hub member 144. Each vane 150 has an upper surface 159 directed generally toward the inlet end of a separator tube (for example tube 161 of FIG. 12). Surface 159 may be referred to as a high pressure surface as contaminant laden air strikes surface 159 which imparts a circular flow component to the air flow. Each vane also has a low pressure surface 149 opposite surface 159. In the preferred embodiment vanes 150 are helical in shape, but, it will be understood that alternative vane structures are within the spirit and scope of the present invention. In general surface 159 slopes in a direction from leading edge 151 to trailing edge 153 and circumferentially about hub member 144. Additionally while four equi-angularly spaced vanes 150 are disclosed it is to be understood that the present invention is not limited to a four vane vortex generating means.

Figure 2:
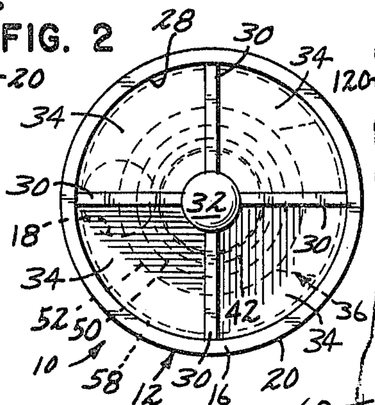
FIG. 2 is a plan view of the inlet end of the separator tube shown in FIG. 1.
Figure 12:
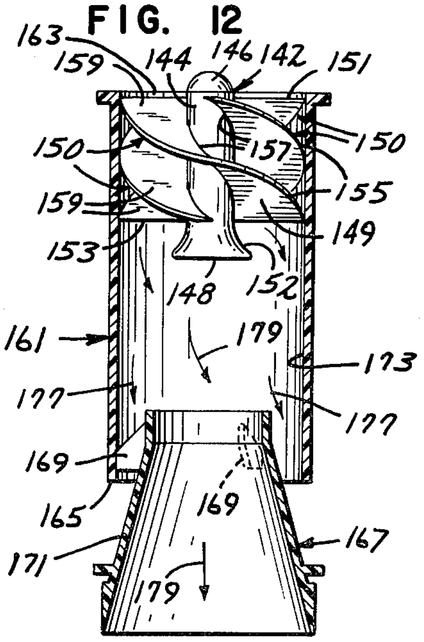
FIG. 12 is an axial sectional view illustrating the improved vortex generating device as utilized in a prior art straight-through axial cyclone separator tube.

The operation of vortex generating means 142 has been described with reference to separator tube 10 disclosed in FIGS. 1–3 and separator tube 66 disclosed in FIGS. 6 and 7. FIG. 12 illustrates the use of improved vortex generating means 142 in a prior art straight-through axial flow separator tube 161. Separator tube 161 has an inlet end 163 and an outlet end 165. A clean air discharge conduit 167 is secured within separator tube 161 proximate outlet end 165 by a plurality of tabs 169. Separator tube 161 has a central longitudinal axis along which elongated hub member 144 is aligned. Vortex generating means 142 is affixed within separator tube 161 at inlet end 163.

Clean air outlet conduit 167 has a continuous side wall 171 which together with an inner surface 173 of separator tube 161 defines an annular outlet passageway 175 for contaminant laden air. As previously discussed, vortex generating means 142 imparts a circular flow component to contaminant laden air entering inlet end 163. The vortex generated in the fluid flow directs the heavier contaminants against inner surface 173. Diverging surface 152 also directs contaminants that may be trapped in the vortex near the longitudinal axis of hub member 144 toward inner surface 173. The contaminants exhaust through chamber 175 as indicated generally at 177. Clean air is discharged through conduit 167 as shown at 179.

It will be apparent from the above description that the present invention is a side outlet cyclone separator tube having an improved vortex generating means. In one embodiment, in which the separator tube has one portion in the shape of a frustum of an oblique cone, a plurality of such separator tubes are utilized in an air cleaner having improved flow capacity and separation efficiency. In either embodiment, the advantages of high throughput and efficiency that can be obtained in a prior art straight-through cyclone separator and the non-scavenge flow characteristics of a prior art reverse flow cyclone separator are combined in a single side outlet separator tube. The improved vortex generating means is applicable not only in the side outlet tube of the present invention, but also in the prior art straight-through cyclone separator.

What is claimed is:

1. A side outlet cyclone separator tube through which contaminant-laden air flows, comprising:

(a) a first conduit member having a continuous side wall and an inner surface defining a generally axial passageway between inlet and outlet ends thereof, said continuous side wall having an aperture disposed intermediate said inlet and outlet;

(b) a second conduit member having a continuous side wall and inner and outer surfaces defining a passageway between an inlet end disposed within said axial passageway proximate said inlet end of said first conduit member and an outlet end terminating at said aperture, said second conduit member having a curved central axis with the inside diameter thereof measured along planes normal to said central axis gradually increasing from said inlet end of said second conduit member to said outlet aperture;

(c) vortex generating means affixed to said first conduit member within said axial passageway at said inlet end thereof whereby a circular flow component is imparted to the axial flow of aid contaminant-laden air such that contaminants are centrifugally blown toward said inner surface of said first conduit member to exit through said outlet end thereof, while clean air is channeled through said second conduit member to discharge through said aperture in said side wall of said first conduit member; and (d) baffle means affixed to said outer surface of said second conduit member proximate said inlet end thereof to prevent the reverse flow of contaminants into said inlet end of said second conduit member.

2. A side outlet cyclone separator tube in accordance with claim 1 wherein said vortex generating means further comprises:

an elongated hub having a leading end and a trailing end;

a plurality of vortex generating vanes spaced radially about and affixed to said elongated hub, said vanes having surfaces which impart a circular flow component to said contaminant laden air whereby contaminants are centrifugally thrown radially outward toward said inner surface of said first conduit member; and said trailing end of said hub having a surface which curves radially outward with respect to said axis of said first conduit member to direct contaminant laden air against said inner surface of said first conduit member.

3. A side outlet cyclone separator tube in accordance with claim 2 wherein said baffle means further comprises an annular lip.

4. A side outlet cyclone separator tube in accordance with claim 3 wherein said vortex generating vanes are helical.

5. A side outlet cyclone separator tube in accordance with claim 1 wherein said first conduit member further comprises a cylindrical first portion in which said aperture is provided and a frusto-conical second portion terminating at said outlet end of said first conduit member.

6. A side outlet cyclone separator tube through which contaminant-laden air flows, comprising:

(a) a first conduit member having a continuous side wall and an inner surface defining a generally axial passageway between inlet and outlet ends thereof, said continuous side wall having an aperture disposed intermediate said inlet and said outlet, said first conduit member further comprising:

(i) a first tubular portion at said inlet end thereof;

(ii) a frustum of a hollow oblique cone portion, said frustum portion having a continuous side wall which converges along said axis of said tubular member from said first tubular portion to said outlet end, said aperture disposed in said converging side wall, said frustum portion defining an axial flow passageway of decreasing cross-sectional area from said tubular portion to said outlet end;

(b) a second conduit member having a continuous side wall and inner and outer surfaces defining a passageway between an inlet end disposed within said axial passageway proximate said inlet end of said first conduit member and an outlet end terminating at said aperture, second conduit member having a curved central axis with the inside diameter thereof measured along planes normal to said central axis gradually increasing from said inlet end of said second conduit member to said outlet aperture;

(c) vortex generating means affixed to said first conduit member within said axial passageway at said inlet end thereof whereby a circular flow component is imparted to the axial flow of said contaminant-laden air such that contaminants are centrifugally thrown toward said inner surface of said first conduit member to exit through said outlet end thereof, while clear air is channeled through said second conduit member to discharge through said aperture in said side wall of said first conduit member; and (d) baffle means affixed to said outer surface of said second conduit member proximate said inlet end thereof to prevent the reverse flow of contaminants into said inlet end of said second conduit member.

7. An air cleaner comprising:

(a) a housing having a longitudinal axis, a contaminant laden air inlet and a clean air outlet;

(b) baffle means affixed within said housing and dividing said housing into an inlet chamber, an outlet chamber, and a contaminant trap chamber;

(c) a plurality of side outlet separator tubes secured to said baffle means, each of said separator tubes having a continuous side wall defining an axial passageway between an inlet end opening into said inlet chamber and an outlet end opening into said trap chamber, said side wall having a side outlet aperture opening into said outlet chamber, said separator tubes disposed within said housing in parallel rows, said axes of said tubes parallel to said longitudinal axis of said housing, the axis of tubes in a row lying in a common plane, said tubes in at least two adjacent rows disposed so that said side outlet apertures of said tubes in each row face generally toward said side outlet apertures of said tubes in said adjacent row, said side outlet apertures in said tubes in one row offset with respect to said side outlet apertures in said tubes in said adjacent row, said side outlet apertures in said side wall in said adjacent rows defining a clean air channel between said tubes, said channel having an axis orthogonally oriented with respect to said longitudinal axis of said housing;

(d) means within each of said separator tubes at said inlet ends thereof for generating a vortex in the axial flow of contaminant laden air whereby said contaminants are directed toward said side walls and deposited within said trap chamber; and (e) means disposed within said separator tube for collecting clean air and channeling said clean air through said side outlet aperture.

8. An air cleaner in accordance with claim 7 wherein said side outlet separator tubes further comprise:

a first tubular portion at said inlet end thereof; and a frustum of a hollow oblique cone portion, said frustum portion having a continuous side wall which converges along said axis from said first tubular portion to said outlet end, said aperture formed in said converging side wall and said frustum portion defining an axial flow passageway of decreasing cross-sectional area from said tubular portion to said outlet end.

9. An air cleaner in accordance with claim 7 wherein said vortex generating means further comprises:

(a) an elongated hub member having a leading end and a trailing end;

(b) a plurality of vortex generating vanes spaced radially about and affixed to said hub, said vanes having surfaces which impart a circular flow component to said contaminant laden air whereby contaminants are centrifugally thrown against said inner surface of said first conduit member; and (c) said trailing end of said hub member having a surface which curves radially outward with respect to said axis for directing contaminant laden air against said inner surface of said first conduit member.

10. An air cleaner in accordance with claim 7 wherein said collecting means further comprises a second conduit member having a continuous side wall with inner and outer surfaces and defining a passageway between an outlet end terminating at said aperture in said side wall and an inlet end disposed within said axial passageway proximate said inlet end of said first conduit member and spaced apart from said trailing end in a direction along said axial passageway toward said outlet end of said first conduit member.

11. An air cleaner in accordance with claim 10 further comprising baffle means affixed to said outer surface of said second conduit member proximate said inlet end thereof, said baffle means comprising at least one annular lip.

12. A side outlet cyclone separator tube through which contaminant laden air flows, comprising:

(a) a first conduit member having a continuous side wall and an inner surface defining a generally axial passageway between inlet and outlet ends thereof, said continuous side wall having an aperture disposed intermediate said inlet and outlet;

(b) a second conduit member having a continuous side wall and inner and outer surfaces defining a passageway between an inlet end disposed within said axial passageway proximate said inlet end of said first conduit member and an outlet end terminating at said aperture;

(c) vortex generating means affixed to said first conduit member within said axial passageway at said inlet end thereof whereby a circular flow component is imparted to the axial flow of said contaminent laden air such that contaminants are centrifugally thrown toward said inner surface of said first conduit member to exit through said outlet end thereof, while clean air is channeled through said second conduit member to discharge through said aperture in said side wall of said first conduit member;

(d) a first annular lip affixed to said outer surface of said second conduit member proximate said inlet end thereof; and (e) a second annular lip affixed to said outer surface of said second conduit member spaced apart from said first annular lip along said axial passageway.

* * * * *

UNITED STATES PATENT AND TRADEMARK OFFICE
CERTIFICATE OF CORRECTION

PATENT NO. : 4,162,906

DATED : July 31, 1979

INVENTOR(S) : BRUCE M. SULLIVAN and ALLEN M. KALUZA

It is certified that error appears in the above-identified patent and that said Letters Patent are hereby corrected as shown below:

Column 9, line 27, the word "aid" should be changed to --said--.

Column 10, line 37, the word "clear" should be changed to --clean--.

Signed and Sealed this

*Fourth* Day of *December 1979*

[SEAL]

*Attest:*

SIDNEY A. DIAMOND

*Attesting Officer* *Commissioner of Patents and Trademarks*